US010640657B2

(12) United States Patent
Priemen et al.

(10) Patent No.: US 10,640,657 B2
(45) Date of Patent: May 5, 2020

(54) POLYISOCYANATE-BASED INTUMESCENT COATING

(71) Applicant: Huntsman International LLC, The Woodlands, TX (US)

(72) Inventors: Stefan Priemen, Sint Truden (BE); Marc Broekaert, Zottegem (BE); Pierre Bachelet, Helesmes (FR); Fabienne Samyn, La Madeleine (FR); Sophie Duquesne, Saint-Andre-Lez-Lille (FR); Serge Bourbigot, Villeneuve d'Ascq (FR)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 228 days.

(21) Appl. No.: 15/025,576

(22) PCT Filed: Oct. 7, 2014

(86) PCT No.: PCT/EP2014/071375
§ 371 (c)(1),
(2) Date: Mar. 29, 2016

(87) PCT Pub. No.: WO2015/052148
PCT Pub. Date: Apr. 16, 2015

(65) Prior Publication Data
US 2016/0222226 A1 Aug. 4, 2016

(30) Foreign Application Priority Data

Oct. 11, 2013 (EP) ..................................... 13188312

(51) Int. Cl.
| C08K 3/30 | (2006.01) |
|---|---|
| C09D 175/04 | (2006.01) |
| C09D 5/18 | (2006.01) |
| B05D 1/02 | (2006.01) |
| C08K 3/22 | (2006.01) |
| C08K 3/38 | (2006.01) |
| C08K 5/00 | (2006.01) |
| C08K 3/32 | (2006.01) |
| C08K 5/3492 | (2006.01) |
| C08K 3/016 | (2018.01) |
| C08K 9/04 | (2006.01) |

(52) U.S. Cl.
CPC ............... *C09D 5/185* (2013.01); *B05D 1/02* (2013.01); *C09D 175/04* (2013.01); *C08K 3/016* (2018.01); *C08K 3/22* (2013.01); *C08K 3/32* (2013.01); *C08K 3/38* (2013.01); *C08K 5/0066* (2013.01); *C08K 5/34922* (2013.01); *C08K 9/04* (2013.01); *C08K 2003/2241* (2013.01); *C08K 2003/322* (2013.01); *C08K 2003/323* (2013.01); *C08K 2003/387* (2013.01)

(58) Field of Classification Search
CPC ...... C09D 5/185; C09D 175/04; C08K 3/016; C08K 3/22; C08K 2003/2241; C08K 3/32; C08K 2003/323; C08K 2003/387
See application file for complete search history.

(56) References Cited

U.S. PATENT DOCUMENTS

| 3,169,945 | A | | 2/1965 | Hostettler et al. |
|---|---|---|---|---|
| 3,644,457 | A | * | 2/1972 | Konig et al. ........ C08G 18/8019 560/351 |
| 3,689,462 | A | | 9/1972 | Maximovich |
| 3,689,609 | A | | 9/1972 | Robinson |
| 4,211,854 | A | | 7/1980 | Robinson |
| 4,213,000 | A | | 7/1980 | Coates |
| 4,294,997 | A | | 10/1981 | Stock et al. |
| 4,529,467 | A | | 7/1985 | Ward et al. |
| 4,533,729 | A | | 8/1985 | Newland et al. |
| 4,725,457 | A | | 2/1988 | Ward et al. |
| 4,831,062 | A | | 5/1989 | von Bonin |
| 5,173,515 | A | | 12/1992 | von Bonin et al. |
| 2010/0056660 | A1 | | 3/2010 | Rosthauser |
| 2010/0209645 | A1 | | 8/2010 | Breen et al. |
| 2010/0227952 | A1 | | 9/2010 | Futterer et al. |
| 2012/0174508 | A1 | | 7/2012 | Brooks et al. |

FOREIGN PATENT DOCUMENTS

| CA | 2137112 | 6/1995 |
|---|---|---|
| EP | 0 400 402 | 5/1990 |
| EP | 1 215 222 | 6/2002 |
| WO | 00/14167 | 3/2000 |
| WO | 2009/013532 | 1/2009 |
| WO | 2010/024890 | 3/2010 |

* cited by examiner

*Primary Examiner* — Michael L Leonard
(74) *Attorney, Agent, or Firm* — Huntsman International LLC; Robert Diaz

(57) ABSTRACT

Intumescent coating composition comprising a polyisocyanate, a polyfunctional isocyanate-reactive compound and an intumescent ingredient, wherein the intumescent ingredient contains at least one or more compounds containing phosphorus, nitrogen and boron atoms and the weight ratio phosphorus to nitrogen in said intumescent ingredient is between 0.5/1 to 1.5/1 and the amount of boron is from 1 to 5 wt % based on the coating composition.

12 Claims, No Drawings

POLYISOCYANATE-BASED INTUMESCENT COATING

This application is the National Phase of International Application PCT/EP2014/071375 filed Oct. 7, 2014 which designated the U.S. and which claims priority to Foreign Application No. 13188312.6 filed Oct. 11, 2013. The noted applications are incorporated herein by reference.

The present invention relates to intumescent coating compositions that have particular, but not exclusive, application in protecting steel structures in a fire situation. In particular, the present invention relates to an intumescent polyurethane coating comprising a binder containing polyol and polyisocyanate components, intumescent additives and optionally inorganic fillers.

Steel is a material widely used in the construction industry (bridges, buildings, cars) and also plays an important role in other markets such as marine, military and offshore platforms. Structural steel is the material of choice for all these applications and usually the first choice of the architects and engineers. It offers design flexibility and is a non combustible material.

But in case of fire, its high heat conductivity leads to a rapid loss of the structural properties with increasing temperature. At about 500° C., a significant part of its load ability is lost. To allow occupants to safely evacuate or emergency services to safely enter a building during fire, it is crucial to maximise the amount of time that a steel component can maintain its load bearing strength. The period of fire resistance required of fire resistant beams is generally specified in building regulations in terms of 30, 60, 90 or 120 minutes of fire protection (meaning that the beam will not fail for that period of time when exposed to a fire). For example, a steel structure of up to three floors may generally be required to have at least 60 minutes, going up even to 120 or 180 minutes of fire protection before yielding.

One way to seek to achieve the desired longevity is by applying to the steel structure an intumescent coating (e.g. an intumescent paint). Such a coating contains a resin "pigmented" with various intumescent ingredients that under the influence of heat, react together to produce an insulating foam or "char", having low thermal conductivity, which has a volume many times that of the original coating. An intumescent acrylic based coating typically expands 50 to 100 times on exposure to heat and forms a heat resistant barrier which keeps the steel cool; an epoxy based intumescent coating typically expands 5 to 10 times on exposure to heat.

This char shields the underlying structural components from the heat thereby delaying the time taken for the structural components to reach their critical failure temperature (CFT). The CFT is the temperature at which the structural integrity of the steel components is compromised. If the aforementioned components form part of the structure of a building then this may lead to collapse of the building.

The delay in reaching the CFT enables safe evacuation of the building whilst increasing the time available for fire fighting teams to extinguish the fire thereby greatly reducing the risk of the building collapsing.

Intumescent coatings are designed to perform under severe conditions and to maintain the steel integrity for up to three hours when the temperature of the surroundings is in excess of 1100° C.

The intumescent ingredients generally consists of three active components which supply the following functions: an acid source (precursor for catalytic acidic species), a carbon source, and a spumific or gas source. Preferably an inorganic "nucleating agent" is also present. Optionally additives, which may be solid or liquid in nature, may be added to aid char formation on burning and/or strengthen the char layer.

In a first stage, the reaction of the acidic species with the carbonization agent takes place with formation of ester mixtures, followed by the carbonization process. In a second step, the spumific agent decomposes to yield gaseous products which cause the char to swell.

A typical prior art intumescent filler package includes titanium dioxide, pentaerythritol or dipentaerythritol, ammonium polyphosphate, melamine or melamine containing compounds such as melamine phosphate and melamine cyanurate. A preferred intumescent filler package could be as follows:

Titanium dioxide (5-15% by weight of total coating composition)

Pentaerythritol (5-15% by weight of total coating composition)

Ammonium polyphosphate (20-40% by weight of total coating composition)

Melamine (5-15% by weight of total coating composition)

Intumescent coating compositions are commonly used to protect steel components against the effects of fire conditions known in the art including cellulosic (the burning of paper, wood, etc.), hydrocarbon (petrochemical liquids and gases) and/or jetfire (a hydrocarbon fuel ejected under high pressure).

Prior art intumescent coatings for cellulosic fires tend to be based on thermoplastic resin systems such as acrylate or vinyl resins; the typical thickness being between 250 μm and 5 mm. Hydrocarbon fire protection however is largely based on thermosetting epoxy resin technology and requires thicknesses from 3 mm to 18 mm.

Acrylic systems are however poorly weather resistant and epoxy systems need longer drying times.

Traditionally, intumescent coatings were applied on-site to steel structures during the construction phase of the building. More recently in-shop application has become more common practice, as better control of application conditions is possible.

The intumescent coatings currently available are generally applied in liquid form via standard airless spray equipment, a standard technique for industrial paint application.

The thickness of the dry intumescent coatings ranges from 250 microns (3-5 times thicker than conventional paint thickness) up to several millimetres thick depending upon the type and size of the structural components and the duration of protection required in the event of a fire.

The currently available intumescent coatings are accompanied by long drying times particularly at the aforesaid elevated thickness. It is not uncommon to allow several days between the application of the intumescent coating and the handling of the coated structural component in order to prevent damage occurring to the coating.

Accordingly, it is impractical to apply the said intumescent coatings to structural components and transport these structural components to site the same day. Additionally the application of the said intumescent coatings on site causes delays in the construction process which may result in significantly increased financial burdens.

Recently, faster drying intumescent coatings have been made available. However, for the most part, the drying time remains in excess of 1-2 days.

Therefore it is still not possible to apply liquid intumescent coatings to structural components and transport these structural components to site the same day when the said intumescent coatings have been applied "in-shop".

EP 1215222 describes intumescent two-component polyurethane coatings comprising 10 to 50 wt % of a polyurethane binder containing a polyol component and a polyisocyanate component, 10 to 60 wt % of intumescent additives and 5 to 30 wt % of inorganic fillers. Examples of suitable intumescent additives listed are ammonium compounds such as ammonium polyphosphate, ammonium dihydrogenphosphate, ammonium pentaborate, melamine, dicyandiamide, full phosphoric esters, bicyclopenterythritphosphate, ammonium hydrogenphosphate, trishydrazinotriazine phosphate, Expancel (AKZO) and CYCLOTHERM (Cyclotec). As examples of inorganic fillers are named: titanium dioxide, zinc borate, quartz, clay, zinc oxide, talc, calcium silicate, enamels and fits and mixtures thereof. In the examples a formulation containing 40 wt % ammonium polyphosphate, 20 wt % melamine, 20 wt % phosphoric acid and 20 wt % titanium dioxide is used as intumescent additives and organic fillers.

The existing polyurethane based intumescent coatings are limited in cure speed and need to be applied in several coats with intermediate cure to obtain the layer thickness needed for the fire protection performance.

It is an object of the present invention to provide a relatively quick-drying, fast-curing intumescent polyurethane coating that can compete with epoxy and acrylics based intumescent systems which represent actually the mainly used solutions.

According to a first aspect of the present invention there is provided a coating composition comprising a polyisocyanate, a polyfunctional isocyanate-reactive compound and an intumescent ingredient, wherein the intumescent ingredient contains at least one or more compounds containing phosphorus, nitrogen and boron atoms and the weight ratio phosphorus to nitrogen in said intumescent ingredient is between 0.5/1 to 1.5/1 and the amount of boron is from 1 to 5 wt % based on the coating composition.

According to a second aspect of the present invention there is provided a process for forming a cured intumescent substance comprising applying a composition according to the first aspect to a substrate and allowing the composition to cure.

According to a third aspect of the present invention, there is provided a cured intumescent substance obtainable by the process as described in the second aspect.

According to a fourth aspect of the present invention, there is provided a polyisocyanate for use in the composition according to the first aspect.

The composition of this invention has high intumescence efficiency and results in faster cure time (touch-dry in less than 5 minutes) and a more efficient and cheaper fire-protective process (60 minutes, preferably up to 100 or even 120 minutes fire resistance). Further according to some embodiments the compositions of the present invention are halogen-free and solvent-free.

Another benefit is that the coating composition of the present invention has high build spray capability allowing thick films to be applied without sagging and without intermediate cure needed, further reducing drying times compared with multiple coats of prior art intumescent coatings requiring intermediate cure.

The intumescent coatings obtained show excellent mechanical properties, have a smooth finish and are repairable and pigmentable. They show improved weather resistance and can be recoated with a similar intumescent coating or with a topcoat.

The intumescent ingredient for use in the present intumescent coating composition is typically provided in the form of an intumescent filler composition which comprises two or more ingredients, which together result in intumescence.

The intumescent filler composition (which may alternatively be referred to as an "intumescent filler package") for use in the present invention contains at least one or more compounds containing phosphorus (P), nitrogen (N) and boron (B) atoms. These might be different compounds each one containing either P, N or B or one or more compounds can contain two or more of P, N and/or B.

According to the invention the weight ratio of phosphorus atoms to nitrogen atoms present in the intumescent filler composition is between 0.5/1 to 1.5/1, preferably between 0.8/1 and 1/1 or between 0.7/1 to 0.9/1, most preferably between 0.6/1 to 1/1.

Further according to the invention the weight percentage boron atoms on the total coating formulation is between 1 and 5%, preferably between 1 and 3.5%, more preferably between 1 and 2.5%.

In general according to the invention the weight ratio of phosphorus and nitrogen atoms to boron atoms in the intumescent filler package is between 10/1 to 0.5/1, preferably between 7/1 to 2/1, more preferably between 6/1 to 3/1, most preferably between 6/1 to 4/1.

Apart from the compounds containing P, N and/or B atoms the intumescent filler composition for use in the present invention may contain other intumescent ingredients.

The acid source intumescent filler for use in the present invention may be selected from, for instance, ammonium polyphosphate, melamine (poly)phosphate, magnesium sulphate, boric acid, phosphorus containing polyols and dihydroxaphosphaphenanthrene oxide and adducts thereof.

A preferred acid source is ammonium polyphosphate. Ammonium polyphosphate can vary in molecular weight (chain length), the lower the molecular weight, the higher the solubility. By having very high molecular weight and a crosslinked structure it is possible to have very low water solubility, though higher thermal stability is observed. Coating ammonium polyphosphate with silane, melamine or melamine formaldehyde is beneficial in further reducing solubility and can also lead to higher loadings due to a reduction in resin absorbing properties. The use of coated ammonium polyphosphate is preferred, and ammonium polyphosphate coated with melamine formaldehyde is most preferred.

The acid source preferably constitutes from 20 to 50% by weight of the intumescent ingredient content of the coating composition.

In the present invention the polyurethane resin binder acts as the main carbon source in the intumescent composition. Therefore additional customary carbon sources such as polyhydric alcohols (pentaerythritol and dipentaerythritol) are generally not needed but may be present. Starch and expandable graphite are other possible carbon sources. Additional carbon sources, if present, preferably constitutes from 5 to 40%, more preferably about 20% by weight of the intumescent ingredient content of the coating composition.

Suitable gas sources for use in the intumescent composition of the present invention include melamine, melem, melon, melam, melamine orthophosphate, melamine pyrophosphate, dimelamine pyrophosphate, melamine polyphosphate, melamine phosphate, melamine borate, melamine formaldehyde, melamine cyanurate, tris-(hydroxyethyl) isocyanurate (THEIC), ammonium polyphosphate, ethylenediamine phosphate, piperazine phosphate, piperazine polyphosphate, 1,3,5-triglycidyl isocyanurate, triallyl isocyanurate and mixtures thereof, and chlorinated paraffin. The preferred gas source is melamine or a derivative thereof preferably containing nitrogen or phosphorus.

The gas source preferably constitutes from 5 to 40%, more preferably about 20% by weight of intumescent ingredient content of the coating composition.

It will be understood that one component may supply more than one function of the intumescent ingredients. Thus, melamine phosphate could be the acid source and the gas source; or the boron containing compound could be the acid source and the gas source; or the resin binder could be the carbon source and the gas source, as well as being a major component of the polymer coating. When one component supplies more than one function, the component may be present in an amount selected from any definition herein, applying to the relevant function. For example, melamine phosphate present as an acid source and as a gas source may be present in an amount of from 5 to 60% by weight of the coating composition. More preferably, in such a situation where one component supplies more than one function, the component is present in an amount satisfying each definition herein, applying to the relevant functions; for example melamine phosphate is most preferably present in an amount of from 20 to 40% by weight of the coating composition.

Examples of suitable boron-containing compounds to be used in the intumescent filler package of the present invention include alkali metal borates such as borax decahydrate (=borax), borax pentahydrate, disodium octaborate tetrahydrate, anhydrous borax, sodium metaborate, potassium tetraborate, potassium pentaborate; boric acid and boric oxide; alkaline earth metal borates such as calcium borate, magnesium borate, barium metaborate; transition metal borates such as zinc borates, aluminum borate, manganese borate, silver borate, iron borate, copper borate, nickel borate, strontium borate, lead borate, zirconium borate; boron and nitrogen-containing compounds such as ammonium tetraborate, ammonium pentaborate, melamine diborate, guanidium borate, boron nitride, borazine; borester and boron-carbon compounds such as boric acid esters, boric acid ester salts, boronic acid, boron carbide; boron and phosphorus-containing compounds such as boron phosphate, phosphine-borane; boron and silicon-containing compounds such as borosilicate, borosilicate glass, fits, borosiloxane; layered double hydroxides with borate; fluoroborates. Preferred compounds are ammonium tetraborate and ammonium pentaborate. According to particular embodiments of the present invention boric acid and/or boric oxides are not present in the intumescent coating composition.

The boron-containing compound is usually present in an amount of 10 to 60% by weight based on the intumescent ingredient content.

Although not an essential ingredient in intumescent reactions, inorganic "nucleating" agents are a preferred ingredient since they promote sites for the intumescent char to form, improve the thermal resistance properties and stability of the intumescent char during a fire. The intumescent coating compositions of the present invention ideally contain at least one nucleating agent, examples of which include titanium dioxide, zinc oxide, aluminium oxide, silica, fumed silica, silicates such as magnesium silicate, potassium silicate, sodium silicate, calcium silicate, aluminium silicate, calcium magnesium silicate (talc) and zeolites, heavy metal oxides such as cerium oxide, lanthanum oxide and zirconium oxide, mica and bentonite clay. A preferred nucleating agent is titanium dioxide which also provides opacity to the coating.

The nucleating agent preferably constitutes from 1 to 25%, preferably between 15 and 20% by weight of the intumescent ingredient content of the coating composition. More preferably the nucleating agent constitutes from 1 to 10% of the coating composition or even more preferred from 5 to 10% by weight of the coating composition.

Further optional additives may be included as part of the intumescent ingredient to aid char formation and to strengthen the char and prevent char degradation. Such additives include solids such as zinc borate, zinc stannate, zinc hydroxystannate, glass flake, glass spheres, polymeric spheres, fibres (ceramic, mineral, glass/silica based), aluminium hydroxide, antimony oxide, boron phosphate, fumed silica, expandable graphite.

A typical intumescent filler package for use in the present invention, usually present in an amount of between 30 and 50% on total coating composition, includes:
Titanium dioxide (10% to 20%)
Ammonium pentaborate (tetrahydrate) (10 to 60%)
Ammonium polyphosphate (20 to 40%)
Melamine (5 to 40%)

The total intumescent ingredients ideally constitute from 10 to 90% by weight of the coating composition. More preferably the total intumescent ingredients constitute from 30 to 70% by weight of the coating composition or even 40 to 50% or 60 to 70% by weight. Compositions comprising less intumescent ingredients than this are not so effective at producing intumescence.

The intumescent ingredient is generally present in an amount such that the composition is capable of swelling to at least three times, preferably at least ten times, most preferably at least 50 times its original volume when exposed to temperatures found in a typical fire situation. The temperature in a fire can be anywhere in the range 150 to 1000° C. and it is preferred that the composition starts to intumesce at a temperature in the lower part of this range. The reference temperature for measurement of swelling can be taken to be 500° C.

By expansion ratio is meant the number of times the composition swells compared to its original volume.

Typically the intumescent composition of the invention swells to more than 300%, preferably more than 1000%, more preferably more than 5000% of its original thickness when in the form of a coating and exposed to heat at a temperature of 500° C. For instance, the composition may be applied to a substrate to form a layer approximately 1 mm thick after curing. Upon exposure to heat at a temperature of 500° C. this may swell to a thickness in the range 5 to 10 mm.

According to the present invention said intumescent ingredient is used together with a polyurethane binder. But it is to be understood that said intumescent ingredient could also be used in an intumescent coating based on any other type of binder customarily used in such intumescent coatings e.g. various thermosetting and thermoplastic resins such as formaldehyde, acrylates, epoxies, modified silanes and polyethylene.

The polyurethane resin binder preferably constitutes from 20 to 90% by weight of the coating composition. More preferably the resin binder constitutes from 30 to 60% by weight of the coating composition.

The polyurethane resin binder is formed by reaction between a polyisocyanate and at least one polyisocyanate-reactive compound optionally in the presence of a catalyst and other optional additives.

The polyisocyanate for use in the present invention may comprise any number of polyisocyanates, including but not limited to, toluene diisocyanates (TDI), diphenylmethane diisocyanate (MDI)-type isocyanates, and prepolymers of these isocyanates. Preferably the polyisocyanate has at least two aromatic rings in its structure, and is a liquid product. MDI-type isocyanates and derivatives thereof having a functionality greater than 2, preferably 2.1-2.2, are preferred.

The diphenylmethane diisocyanate (MDI) for use in the present invention can be in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, or any of their derivatives having a urethane, isocyanurate, allophonate, biuret, uretonimine, uretdione and/or iminooxadiazinedione groups and mixtures of the same.

Examples of other suitable polyisocyanates are tolylene diisocyanate (TDI), hexamethylene diisocyanate (HMDI), isophorone diisocyanate (IPDI), butylene diisocyanate, trimethylhexamethylene diisocyanate, di(isocyanatocyclohexyl)methane, isocyanatomethyl-1,8-octane diisocyanate and tetramethylxylene diisocyanate (TMXDI).

Due to their better miscibility with the isocyanate-reactive composition and their ease of application preferred polyisocyanates for the invention are the semi-prepolymers and prepolymers which may be obtained by reacting polyisocyanates with compounds containing isocyanate-reactive hydrogen atoms. Examples of compounds containing isocyanate-reactive hydrogen atoms include alcohols, glycols or even relatively high molecular weight polyether polyols and polyester polyols, mercaptans, carboxylic acids, amines, urea, amides and amino functional silanes (such as described in WO 2010/131037). Particularly suitable prepolymers are reaction products of polyisocyanates with monohydric or polyhydric alcohols.

The prepolymers are prepared by conventional methods, e.g. by reacting polyhydroxyl compounds which have a molecular weight of from 400 to 5000, in particular mono- or polyhydroxyl polyethers, optionally mixed with polyhydric alcohols which have a molecular weight below 400, with excess quantities of polyisocyanates, for example aliphatic, cycloaliphatic, araliphatic, aromatic or heterocyclic polyisocyanates.

Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether polyols obtained by ring-opening copolymerisation of alkylene oxides, such as ethylene oxide and/or propylene oxide, with isocyanate-reactive initiators of functionality 2 to 8. Preferably the polyether polyols are based on propylene oxide, optionally in combination with up to 20 wt % (based on total alkylene oxides) of ethylene oxide.

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebacic acid, and the like can be given.

Other examples of polyhydric compounds for use to prepare said prepolymers include phosphorus containing polyols or Mannich based polyols, polycarbonate polyols, polycaprolactone polyols and polytetramethylene ether glycols or amine derivatives of any of the abovementioned polyols.

Preferably the polyhydric compound used to prepare the prepolymer is one that leads to improved miscibility between the polyisocyanate and the isocyanate-reactive compound in the final formulation.

In a particularly preferred embodiment of the invention prepolymers are used as the polyisocyanate component having an average functionality of 2.0 to 2.9, preferably 2.1 to 2.5, a maximum viscosity of 6000 mPa s, and an isocyanate content of 6 to 30 wt %, preferably 16 to 25 wt %.

The second component in the present coating composition is an isocyanate-reactive compound. Any of the above mentioned compounds can be used.

Preferably at least one of the isocyanate-reactive compounds is a polycarbonate polyol, a polycaprolactone polyol (CAPA), a polytetramethylene ether glycol (PTMEG) or any amine derivative of any of these isocyanate-reactive compounds or any mixture of two or more of these isocyanate-reactive compounds.

Most preferably most or all of the isocyanate-reactive compounds used in the present invention are of the abovementioned types.

By using any of these preferred isocyanate-reactive compounds the fire resistance of the intumescent coating improves, the char structure improves and better adhesion to the substrate is obtained.

The polyfunctional polycarbonate polyol for use in the coating composition of the present invention can be obtained by reacting polyhydric alcohols with a carbonyl component selected from the group consisting of phosgene, a chloroformate, a dialkylcarbonate, a diarylcarbonate, an alkylene carbonate and a mixture thereof. The process for producing such polycarbonate polyols is well known in the art, see, for example, U.S. Pat. Nos. 3,689,462, 4,533,729, 3,689,609.

The polyfunctional polycarbonate polyol for use in the present invention has preferably 2 hydroxyl groups in one molecule and has a number average molecular weight of 200 to 5000, preferably 400 to 1000 and has a hydroxyl value of 20 to 850, preferably 100 to 350. But higher functional (more than 2 or even more than 3) polycarbonate polyols can be used as well.

The polyhydric alcohol used for preparation of the polyfunctional polycarbonate polyol can be a straight chain diol, a branched diol, a triol or higher hydric (4 to 6 hydric) alcohol, or mixture of any of those.

Typical examples of straight chain diols include 1,3-propylene glycol, 1,4-butane diol, 1,5-pentane diol, 1,6-hexane diol, 1,8-octane diol, 1,9-nonane diol and 1,10-decane diol, etc. Typical examples of branched diols are 2-methyl-1,3-propane diol, 3-methyl-1,5-pentane diol, neopentyl glycol, 2,2-diethyl-1,3-propanediol, 2-butyl-2-ethyl-1,3-propane diol, 2,2-diethyl-1,3-propane diol, 2-butyl-2-ethyl-1,3-propane diol, 2-methyl-1,8-octane diol, 2,2,4-trimethyl-1,3-pentane diol, 2-ethyl-1,3-hexane diol, 1,4-cyclohexane dimethanol, etc.

The tri- or higher-hydric alcohols include triols, such as glycerin, trimethylol ethane and trimethylol propane; tetraols, such as trimethylol propane dimer, pentaerythritol and 1,2,7,8-octane tetraol; pentaols such as ribitol, arabitol and xylitol; hexaols such as sorbitol, allitol, mannitol, dulcitol, pentaerythritol dimer and the like.

The polyfunctional polycarbonate polyol used in the present invention may have carboxyl groups with less than 50 acid value. The polycarbonate polyol containing such carboxyl groups is obtained by reacting the polycarbonate polyol with an acid anhydride or a dicarboxylic acid at 120° C.-180° C. The acid anhydride to be used here may be phthalic anhydride, trimelitic anhydride, tetrahydro-phthalic anhydride, succinic anhydride and itaconic anhydride etc. and dicarboxylic acid may be adipic acid, sebacic acid, phthalic acid, isophthalic acid, etc.

Examples of commercially available polycarbonate polyols for use in the present invention include DUREZ-ter 52006 (commercially available from Sumitomo Bakelite Europe), KURARAY Polyol C-590 (commercially available from Kurakay Europe GmbH), ETERNACOLL BH100, PH100 and UH100 (commercially available from UBE Chemical Europe).

The polycaprolactone polyols for use in the coating composition of the present invention generally have an average molecular weight of 290 to 6000, preferably 290 to 3000, most preferably 300 to 1000. Most preferred because of their low viscosity are polycaprolactone diols having an average molecular weight of from 290 to 500 and polycaprolactone triols having an average molecular weight of from 300 to 1000. The average hydroxyl number of the polycaprolactone polyol can be from 15 to 600, preferably from 150 to 500, and the polycaprolactone polyol can have an average of from 2 to 6, preferably 2 to 4, hydroxyl groups.

Illustrative of polycaprolactone polyols that can be used in the present invention are the reaction products of polyhydroxyl compounds having an average of 2 to 6 hydroxyl groups with caprolactone. The manner in which these polycaprolactone polyols are produced is described in U.S. Pat. No. 3,169,945 and many such compounds are commercially available. As described in U.S. Pat. No. 3,169,945 the polycaprolactone polyols are produced by the catalytic polymerization of an excess of a caprolactone and an organic polyfunctional initiator having at least two reactive hydrogen atoms. The polyols for use herein can be single compounds or mixtures of compounds and either can be used. The method for producing the polycaprolactone polyols is of no consequence and the organic polyfunctional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene)glycols and similar polyalkylene glycols, either blocked, capped or heteric, containing up to about 40 or more alkyleneoxy units in the molecule, 3-methyl-1,5-pentanediol, cyclohexanediol, 4,4'-methylene-bis-cyclohexanol, 4,4'-isopropylidene bis-cyclohexanol, xylenediol, 2-(4-hydroxymethylphenyl)ethanol, 1,4-butanediol, and the like; triols such as glycerol, trimethylolpropane, 1,2,6-hexanetriol, triethanolamine, triisopropanolamine, and the like; tetrols such as erythritol, pentaerythritol, N,N,N',N'-tetrakis-(2-hydroxyethyl)ethylene diamine, and the like. The caprolactone to be reacted with the initiator can be caprolactone itself or a substituted caprolactone as described in U.S. Pat. No. 3,169,945.

Examples of commercially available polycaprolactone polyols for use in the present invention include CAPA 2043, 4101 and 4801 (commercially available from Perstorp), PLACCELL 303 (commercially available from Daicel Chemical Industries).

The polytetramethylene ether glycols (PTMEG) for use in the present invention generally have a number average molecular weight ranging from 500 to 5000, preferably 800 to 3000, more preferably from 1000 to 2600. Techniques for the manufacture of PTMEG are well-known in the art, such as described in U.S. Pat. Nos. 4,294,997 and 4,213,000. Examples of useful PTMEG's include TERATHANE polyols (commercially available from DuPont), POLYTHF® 650, POLYTHF® 1000, POLYTHF® 2000 and POLY-THF® 2900 (commercially available from BASF) and POLYMEG (commercially available from QO Chemical.

PTMEG's are generally synthesized by a ring-opening chain extension reaction of the monomeric tertrahydrofuran (THF). In one well-known method, the ring-opening reaction is catalyzed by fluorosulfonic acid, followed by hydrolysis of sulfate ester groups and water extraction of the acid, followed by neutralization and drying. In many cases, the PTMEG will be solid at room temperature because of its high degree of crystallinity. In the event one desires to employ a room temperature liquid PTMEG, the THF can be copolymerized with alkylene oxides (also known as cyclic ethers or monoepoxides) as suggested in U.S. Pat. No. 4,211,854. Such copolymers have an A-B-A block-heteric structure, wherein the A blocks are random copolymers of tetrahydrofuran and alkylene oxides and the B block is made up of polytetramethylene oxides.

The cyclic ethers copolymerizable with tetrahydrofuran are not particularly limited, provided that they are cyclic ethers capable of ring-opening polymerization, and may include, for example, 3-membered cyclic ethers, 4-membered cyclic ethers, cyclic ethers such as tetrahydrofuran derivatives, and cyclic ethers such as 1,3-dioxolan, trioxane, etc. Examples of cyclic ethers include ethylene oxide, 1,2-butene oxide, 1,2-hexene oxide, 1,2-t-butyl ethylene oxide, cyclohexene oxide, 1,2-octene oxide, cyclohexylethylene oxide, styrene oxide, phenyl glycidyl ether, allyl glycidyl ether, 1,2-decene oxide, 1,2-octadecene oxide, epichlorohydrin, epibromohydrin, epiiodohydrin, perfluoropropylene oxide, cyclopentene oxide, 1,2-pentene oxide, propylene oxide, isobutylene oxide, trimethyleneethylene oxide, tetramethyleneethylene oxide, styrene oxide, 1,1-diphenylethylene oxide, epifluorohydrin, 1,1,1-trifluoro-2-propylene oxide, 1,1,1-trifluoro-2-methyl-2-propylene oxide, 1,1,1-trichloro-2-methyl-3-bromo-2-propylene oxide, 1,1,1-tribromo-2-butyleneoxide, 1,1,1-trifluoro-2-butyleneoxide, 1,1,1-trichloro-2-butylene oxide, oxetane, 3-methyloxetane, 3,3-dimethyloxetane, 3,3-diethyloxetane, 3,3-bis(chloromethyl)oxetane, 3,3-bis(bromomethyl)oxetane, 3,3-bis(iodomethyl)oxetane, 3,3-bis(fluoromethyl)oxetane, 2-methyltetrahydrofuran, 3-methyltetrahydrofuran, 2-methyl-3-chloromethyltetrahydrofuran, 3-ethyltetrahydrofuran, 3-isopropyltetrahydrofuran, 2-isobutyl-tetrahydrofuran, 7-oxabicyclo(2,2,1)heptane, and the like.

The content of the copolymerized cyclic ether, if present, in a PTMEG may be within the range of from 5 to 95% by weight.

Additionally, in the synthesizing reaction of PTMEG, a part of the starting THF may be replaced with an oligomer of PTMEG as the starting material. Further, in the synthesizing reaction of a copolymerized polyetherglycol, an oligomer of PTMEG or an oligomer of the polyetherglycol to be synthesized may also be added as a part of the starting material to carry out the reaction.

Most preferably the PTMEG has a number average molecular weight between 600 and 6000 Da, preferably between 1000 Da and 4000 Da, and most preferably between 1300 and 3000 Da.

The polymerisation reaction of the present invention is generally carried out at an isocyanate index of 60 to 150%, preferably 80 to 130%.

Isocyanate index or NCO index or index means the ratio of NCO-groups over isocyanate-reactive hydrogen atoms present in the composition, given as a percentage. In other words the NCO index expresses the percentage of isocyanate actually used in a formulation with respect to the amount of isocyanate theoretically required for reacting with the amount of isocyanate-reactive hydrogen used in the formulation.

The polymerization reaction can take place in the presence of a catalyst.

Any of the catalysts know in the art to catalyse the NCO—OH reaction can be used. Examples of preferred catalysts include dibutyltin dilaurate or any other organometal catalyst such as bismuth or zirconium based catalysts.

The amount of the catalyst used is preferably in the range 0.005 to 5% by weight based on the coating composition.

In some embodiments of the present invention also a low molecular polyisocyanate-reactive chain extender or crosslinking agent (e.g. aromatic and aliphatic diamines such as diethyl toluene diamine or Unilink 4200 (available from Dorf Ketal)) may be present to make the setting faster.

Known additives from coating technology may optionally be added to the coating composition of the present invention. Examples include levelling agents, viscosity-controlling additives, (corrosion protection) pigments, colour pigments or dyes, fillers, matting agents, UV absorbers/stabilizers, antioxidants, water scavengers, thixotropic agents or rheology modifiers, reinforcing agents, plasticizers, surfactants, adhesion promotors (e.g. silanes), defoaming agents, nucleating agents (e.g. nano clays) and antimicrobial agents. These additives may be introduced in amounts ranging from 0.01 to 25% by weight of the total composition.

In order that the intumescent coating compositions can be applied at high film thickness by multiple passes without intermediate cure it is preferred to modify the rheology of the coating by the incorporation of a thixotrope. Suitable thixotropic additives include organically modified inorganic clays such as bentonite clays, hectorite clays or attapulgite clays, organic wax thixotropes based on castor oil and fumed silica. The most preferred thixotropic additives are wax thixotropes and fumed silicas. Diethyl toluene diamine, because of its fast reactivity, can also act as initial chemical thixotropic/setting ingredient to prevent the thick coating from flowing off vertical substances. The thixotropic additive preferably constitutes from 0 to 2% by weight of the total coating composition, preferably 0.05 to 1.5%.

To improve or facilitate dispersion of the intumescent ingredients and also to reduce the overall viscosity of the intumescent coating, it may be necessary to incorporate wetting/dispersion additives. Such additives are usually liquid in form and can be supplied either containing a solvent or be solvent free. Where required preferably a solvent free wetting agent is used, even more preferably a wetting agent with acid functionality is recommended, at levels between 0 and 2% by weight of the intumescent coating composition.

The coating composition may also comprise a solvent to reduce viscosity and improve the sprayability of the composition (e.g. xylene).

The coating composition may also comprise a plasticizer which has the function of softening and extending the final cured polymer network and providing extra liquid components so that the mineral fillers are fully wetted-out.

The components of the intumescent coating composition are preferably blended together by the coating manufacturer using high speed dispersion equipment, whereby the solid intumescent ingredients are wetted out and dispersed in the resin components.

The coating composition is such that it can be coated onto a surface, and remain in place, as the polymeric coating forms. When applied it may suitably be a liquid, or a formable material, for example a gel, mastic, paste or the like. It may comprise one or more solid components, and thus could be a suspension or dispersion.

Suitably the present invention utilises an approach where the coating composition is supplied in more than one component. Preferably the components are mixed immediately prior to use. The individual components may contain different parts of the coating composition that will, when mixed, undergo chemical reactions to cause the molecular weight to rise.

Preferably all the intumescent additives are added to the isocyanate-reactive component but at high loading (>50%) it may be necessary to put part of these additives in the polyisocyanate component. For example, the nucleating agent (e.g. $TiO_2$) or the N and/or P-containing compound (e.g. ammoniumpolyphosphate) or part thereof can be pre-mixed with the polyisocyanate; generally the amount of intumescent additive pre-mixed with the polyisocyanate varies between 0 and 75% by weight, preferably 10 to 50% by weight based on the polyisocyanate composition (containing the polyisocyanate and the intumescent ingredients and no isocyanate-reactive compounds).

If premixed, the boron containing intumescent ingredient is always added to the isocyanate-reactive component; generally the amount of boron containing intumescent ingredient pre-mixed with the isocyanate-reactive compounds varies between 15 and 70% by weight based on the isocyanate-reactive composition containing the isocyanate-reactive compounds and the intumescent ingredient and no polyisocyanate compounds.

According to a second embodiment of the present invention, there is provided a process for achieving a cured intumescent substance.

In the case of a two-part composition this process comprises the steps of (a) applying a first part of a two-part intumescent composition and a second part of a two-part intumescent composition to substrate, and (b) allowing the first part of the two-part intumescent composition and the second part of the two-part intumescent composition to cure by allowing a reaction between the first part and the second part to proceed.

Typically, the first part and the second part of the two-part composition are mixed together prior to application to the substrate. Preferably this pre-mixing occurs very shortly before application to the substrate, for example, a few seconds before application in an on-line mixer incorporated into an airless spraying apparatus, or by means of any other spraying apparatus conventionally used to mix and apply two component coatings to substrates (e.g. impingement mixing or static mixing guns).

The coating compositions of this invention may be applied to substrates to form a coating thereon by a variety of techniques including, but not limited to, casting, (electrostatic) spraying, brushing, dipping, pouring. These and other application techniques are well known to those skilled in the art.

Airless spray is most preferred. Airless spray pumps having a ratio of 45:1 or greater, and preferably 60:1 are suitable. A minimum air pressure of greater than 60 psi and preferably 90 psi is required, and the compositions are sprayed using a tip size ranging from 0.015 inch to 0.035 inch.

The process involves coating substrates with the coating composition usually at elevated temperatures, preferably between 60° C. and 80° C. and allowing the coating to cure to form a film.

Preferably the mean thickness of the polymeric coating is between 1 and 45 mm, more preferably between 2 and 25 mm.

Apart from the liquid intumescent coating composition of the present invention the coating system may also comprise a reinforcement structure.

The reinforcement structure may comprise any of mesh, fabric and/or tape. The reinforcement structure preferably comprises an inorganic fabric. The reinforcement is preferably installed by application of a suitable adhesive binder.

The use of a reinforcement mesh or cloth has been demonstrated to give improved fire protection for the present invention for situations requiring relatively high film thickness, for example greater than 4-5 mm of coating, which would be required for longer periods of fire protection, for example 2 hours and above, or for certain hydrocarbon and jetfire scenarios. A reinforcement structure can also be used at lower film thicknesses of coating, but the improvement effect will be less apparent. The reinforcement preferably takes the form of a woven or knitted mesh based upon non-combustible materials which are predominantly inorganic. There are many examples known to the art including, but not limited to inorganics such as galvanized steel wire mesh, glass or silica fibre, and stainless steel wire and organics such as carbon fibre, aramid fibre and other polymer yerns. The reinforcement preferably comprises a series of rows of interlocking fibres or filaments orientated such that rows of said fibres or filaments intersect at approximately 90° to each other i.e. perpendicular. The spaces between each row of fibres or filaments should preferably be between 1 mm and 20 mm.

The reinforcement can be applied over the entire perimeter of the steel section or only to a selected part of the perimeter. The reinforcement is typically applied into the film at the interface of two layers of coating. It is normally applied onto the surface of a partially cured, pliable, layer and pressed into that layer by roller application. In certain scenarios the mesh and/or fabric is held in place mechanically, by the use of metal pins that are stud welded to the steel substrate. However, it is more preferable that the mesh does not need pinning to the substrate.

For some cellulosic and hydrocarbon fire scenarios, the reinforcement preferably takes the form of a strip of non combustible material for example glass tape of approximately 50-150 mm width. This tape would be placed along the "toes" or corners of a steel section in between usually two coats of the coating of the present invention. The non-combustible tape has the effect of preventing the coating from splitting or slumping in a fire when the coating is applied at the aforementioned 5-6 mm and hence improving the coatings ability to insulate and protect the underlying steel.

Chopped in fiberglass or any other fiberlike material can also be added via a third material stream on the spray gun.

In accordance with one embodiment of the invention there is provided a method of coating a steel body for protection during a fire situation, the method comprising applying the liquid or formable coating composition around the steel body, and allowing it to form a protective polymeric coating around the steel body.

Suitable methods of application of the aforesaid compositions are by means of a plural component spray system. The two components are prewarmed and pumped separately in the correct ratio through fluid lines to a mixing device. This device mixes the two components automatically and then dispenses the mixed homogeneous coating down a fluid line to the application head.

Steel sections requiring fire protection are normally blast clean prior to the application of an intumescent coating to remove millscale and other deposits that may lead to premature failure of the intumescent coating, either on prolonged atmospheric exposure or during a fire situation. In order to prevent deterioration of the blast cleaned surface, particularly where there is a delay in applying the intumescent coating, it is normal practice to apply a primer coating. This is often the case when the intumescent coating is applied on site.

Examples of suitable primers are coatings based on epoxy, modified epoxy (such as modified with polyvinyl butyral), polyurethane, acrylic, vinyl and chlorinated rubber. Primers based on epoxy are preferred.

The thickness of the primer is ideally in the range from 15 microns to 250 microns. Preferably the thickness should be in the range from 25 microns to 100 microns.

Thereafter, the intumescent coating composition of the invention may be applied. The two-parts of a two-part composition are typically mixed very shortly before application to the metal. The composition is generally sprayed onto the metal, although it may alternatively be applied manually.

The dry thickness of the intumescent coating applied typically varies from 250 µm to 45 mm depending on the level of fire protection required, the cross-sectional area of the steel and the perimeter of the steel when viewed in cross-section.

A decorative topcoat may be applied to the cured intumescent coatings of the present invention, particularly to provide colour to exposed steelwork. A topcoat if correctly formulated will also enhance the durability of the intumescent coating. A clear sealer may also be suitable.

Examples of suitable decorative topcoats are coatings based on epoxy, polyurethane, alkyd, acrylic, vinyl and chlorinated rubber. Decorative topcoats based on urethane or epoxy are preferred.

The thickness of the decorative topcoat can vary from 15 microns to 250 microns. Preferably the thickness should be in the range from 25 microns to 75 microns, as too high a thickness of topcoat may inhibit the intumescent reactions.

The coating composition of the present invention preferably provides a steel body with from 30 minutes to 4 hours of fire resistance, depending on the application, nature and geometry of the substrate and the coating thickness. Fire resistance can be determined in accordance with the ISO 834 cellulosic fire standard. Preferably the steel body takes from 30 minutes to 4 hours, and most preferably at least one hour, to reach a critical failure temperature of 500° C.

The coating has particular, but not exclusive application in the coating of steel structures to provide protection against fire by forming an intumescent and insulating char. These coatings are suitable for both on-site and in-shop application.

Compositions of the invention may also be useful in protecting other structural materials such as concrete and timber composites, plastics and insulative foam.

Steel sections and other materials that are coated with the intumescent coating composition of the present invention harden much more rapidly than prior art materials. Drying times are reduced from 24 hours or longer to around 60 minutes. This provides significant benefits to in-shop applicators, and enables a continuous process of application, drying and removal of steel sections from the application area.

Another benefit is that thick films (thickness in the range 1 to 45 mm) can be applied in multiple layers without intermediate curing to a high build coating, further reducing drying times compared with multiple coats of prior art intumescent coatings with intermediate curing.

The various aspects of this invention are illustrated, but not limited by the following examples in which the following ingredients were used.

- SUPRASEC 2496: polymeric MDI ($NCO_v$ 31.3%) available from Huntsman
- SUPRASEC 2029: prepolymerised MDI ($NCO_v$ 24.4%) available from Huntsman
- Albodur 941 VP: polyester polyol based on castor oil ($OH_v$ 319) available from Huntsman
- BH100: polycarbonate diol ($OH_v$ 116) available from UBE Chemical Europe under the name ETERNACOLL
- $H_3BO_3$: orthoboric acid available from Aldrich
- $B_4O_7$: ammonium tetraborate available from Aldrich
- $B_5O_8$: ammonium pentaborate available from Aldrich
- AFLAMMIT PMN544: modified melamine borate available from Thor
- APP: ammonium polyphosphate available from Clariant under the name EXOLIT AP422
- AP760: ammonium polyphosphate modified with tris 2-hydroxyethylisocyanurate available from Clariant under the name EXOLIT AP 760
- Mel: melamine available from Acros or Alpha Caesar
- Penta: pentaerythritol available from Aldrich
- $TiO_2$
- MS603: mineral fibre available from Lapinus under the name ROCKFORCE MS603

EXAMPLE 1

The polyurethane formulations were prepared using the polyisocyanates and polyols identified below in Table 1. The isocyanate index was fixed at 105.

TABLE 1

|     | Polyisocyanate | Polyol      |
| --- | -------------- | ----------- |
| PU1 | SUPRASEC 2496  | Albodur 941 |
| PU2 | SUPRASEC 2029  | Albodur 941 |
| PU7 | SUPRASEC 2029  | BH 100      |

Steel plates coated with the formulations were prepared. The steel plates of 100×100×3 mm³ were cut into a XC38 type of steel. Before applying the coating, the surface was sand blasted and then cleaned with acetone.

All the additives (identified below in Table 2) were added to the polyol and mixed for 1 minute at 5000 rpm. Then the polyisocyanate was quickly added to the mixture containing the polyol. A disposable spatula was used to mix until the mixture was homogeneous.

TABLE 2

|          | C1  | C2  | C3  | S1    | S2   | S3   |
| -------- | --- | --- | --- | ----- | ---- | ---- |
| PU1      | 100 | 60  | 40  | 40    |      |      |
| PU2      |     |     |     |       | 70   | 50   |
| $H_3BO_3$ |     |     |     | 26.67 |      |      |
| $B_4O_7$ |     |     |     |       | 12.5 | 20   |
| APP      |     | 16  | 40  |       |      |      |
| AP760    |     |     |     | 23.33 | 12.5 | 20   |
| Mel      |     | 12  | 10  |       |      |      |
| Penta    |     | 12  |     |       |      |      |
| $TiO_2$  |     |     | 5   | 10    | 5    | 10   |
| MS603    |     |     | 5   |       |      |      |

TABLE 2-continued

|           | C1  | C2  | C3   | S1   | S2   | S3   |
| --------- | --- | --- | ---- | ---- | ---- | ---- |
| P/N       | 0   | 0.5 | 1    | 1.4  | 0.8  | 0.8  |
| % B       | 0   | 0   | 0    | 4.3  | 2.1  | 3.3  |
| $t_{500° C.}$ | 500 | 900 | 1600 | 3200 | 2450 | 3600 |

1 mm thick layer of the intumescent formulation was put on top of the steel plate by pouring and spreading and left to cure. The testing amount was usually 1 kg/m².

Resistance to fire of the cured plates with respect to the ISO 834 cellulosic fires standard were measured using a small scale propane oven. The fire barrier properties of the coatings are evaluated by measuring the time to reach 500° C. in seconds ($t_{500° C.}$)

The samples according to the invention (S1-S3) clearly show an improvement in fire resistance compared to samples of the prior art (C1-C3) (see Table 2).

The use of the particular intumescent filler package of the invention leads to increased $t_{500° C.}$ values, improvement of the char, cohesion (no cracking) and better swelling rate (5 to 15 times the original dry film thickness).

EXAMPLE 2

In the same way as above in Example 1 coatings were prepared using different polyurethane binders (see Table 3).

2 mm thick layer of the intumescent formulation was put on top of the steel plate by pouring and spreading and left to cure. The testing amount was 2 kg/m².

TABLE 3

|           | S4    | S5    |
| --------- | ----- | ----- |
| PU2       | 70    |       |
| PU7       |       | 50    |
| $B_4O_7$  |       | 20    |
| $B_5O_8$  | 9.6   |       |
| PMN544    | 4.05  |       |
| APP       | 10.9  |       |
| AP760     |       | 20    |
| $TiO_2$   | 5.45  | 10    |
| P/N       | 0.9   | 0.8   |
| % B       | 1.8   | 3.3   |
| $t_{500° C.}$ | >4000 | >4000 |

Intumescent polyurethane coatings of the present invention provide $t_{500° C.}$ in the range 60 to 120 minutes and thus can compete with commercial intumescent acrylics coatings.

The invention claimed is:

1. An intumescent coating composition comprising (i) 20% by weight to 90% by weight based on the coating composition of a polyurethane binder resin that is the reaction product of a reactive mixture consisting of a polyisocyanate compound and a polyfunctional isocyanate-reactive compound selected from the group consisting of a polycarbonate polyol, a polycaprolactone polyol, a polytetramethylene ether glycol, or combinations thereof, and (ii) an intumescent filler package, wherein the intumescent filler package contains at least one or more compounds containing a phosphorus atom, a nitrogen atom and a boron atom and the weight ratio of phosphorus to nitrogen in said intumescent filler package is between 0.8/1 to 1.5/1 and the amount of boron is from 1 wt % to 5 wt % based on the coating composition; and wherein the polyisocyanate is a prepolymer compound having an average functionality of 2.0 to 2.9 and a maximum viscosity of 6000 mPa S'.

2. The intumescent coating composition according to claim 1, wherein the intumescent filler package contains ammonium tetraborate, ammonium pentaborate, ammonium polyphosphate, melamine, or combinations thereof.

3. The intumescent coating composition according to claim 1, wherein the intumescent filler package also contains a nucleating agent.

4. The intumescent coating composition according to claim 1, wherein the intumescent filler package constitutes between 10% by weight and 90% by weight of the coating composition.

5. The intumescent coating composition according to claim 1, wherein the polyisocyanate and polyfunctional isocyanate-reactive compound are reacted at an isocyanate index of 60 to 150%.

6. The intumescent coating composition according to claim 1, wherein the intumescent coating composition is a two-part intumescent coating composition comprising a first part comprising polyisocyanate and, optionally, a first part of the intumescent filler package; and a second part comprising the polyfunctional isocyanate-reactive compound and a second part of the intumescent package, and optionally, other additives.

7. A process for forming a cured intumescent substance comprising applying a composition as defined in claim 1 to a substrate and allowing the composition to cure.

8. The process according to claim 7, wherein the composition is applied by spraying, optionally at elevated temperatures.

9. The process according to claim 7, wherein the thickness of the intumescent coating is between 1 mm and 45 mm.

10. The process according to claim 7, wherein the substance is a steel body.

11. The intumescent coating according to claim 1, wherein the intumescent filler package is selected from the group consisting of $TiO_2$, ammonium pentaborate, ammonium polyphosphate, melamine and combinations thereof.

12. The intumescent coating composition according to claim 1, wherein the amount of boron is from 1 wt % to 2.5 wt % based on the coating composition.

* * * * *